(12) United States Patent
Schulte

(10) Patent No.: US 12,461,067 B2
(45) Date of Patent: Nov. 4, 2025

(54) INSPECTION DEVICE FOR THE INSPECTION OF TWO-DIMENSIONALLY EXTENDING METAL OBJECTS

(71) Applicant: ROSEN SWISS AG, Stans (CH)

(72) Inventor: Michael Schulte, Meppen (DE)

(73) Assignee: Rosen IP AG, Stans (CH)

( * ) Notice: Subject to any disclaimer, the term of this patent is extended or adjusted under 35 U.S.C. 154(b) by 0 days.

(21) Appl. No.: 17/907,412

(22) PCT Filed: Mar. 26, 2021

(86) PCT No.: PCT/EP2021/057997
§ 371 (c)(1),
(2) Date: Sep. 27, 2022

(87) PCT Pub. No.: WO2021/198097
PCT Pub. Date: Oct. 7, 2021

(65) Prior Publication Data
US 2023/0122236 A1   Apr. 20, 2023

(30) Foreign Application Priority Data
Mar. 31, 2020 (DE) .......................... 102020108963.5

(51) Int. Cl.
*G01N 27/82* (2006.01)
(52) U.S. Cl.
CPC .................... *G01N 27/82* (2013.01)
(58) Field of Classification Search
CPC .................... G01N 27/82; B60L 7/28
See application file for complete search history.

(56) References Cited

U.S. PATENT DOCUMENTS

| 5,722,326 | A | * | 3/1998 | Post | ........................ | B60L 13/04 |
| | | | | | | 104/281 |
| 6,523,650 | B1 | * | 2/2003 | Pribonic | ................... | B60L 7/28 |
| | | | | | | 188/165 |
| 10,315,237 | B2 | * | 6/2019 | Danilov | ................ | B08B 9/0551 |
| 2012/0253696 | A1 | * | 10/2012 | Pearson | ................. | G01N 27/82 |
| | | | | | | 702/38 |
| 2018/0217097 | A1 | * | 8/2018 | Tada | ....................... | G01N 27/82 |
| 2018/0306749 | A1 | * | 10/2018 | Ruttanasupa | ........ | G01N 29/265 |

FOREIGN PATENT DOCUMENTS

| DE | 102004053584 A1 | 6/2006 |
| DE | 102013011626 A1 | 1/2015 |
| WO |    2021116433 A1 | 6/2021 |

* cited by examiner

*Primary Examiner* — Dominic E Hawkins
(74) *Attorney, Agent, or Firm* — Husch Blackwell LLP

(57) ABSTRACT

An inspection device is provided for inspecting metallic objects extending in planar fashion, in particular sheets or walls. The inspection device is embodied as pipeline-impassable in particular by virtue of dispensing with at least one propulsion element that at least substantially fills an inner pipeline cross section. At least one functional unit is included for recording object information. At least one magnet unit is provided for magnetizing the object, the magnet unit including a plurality of magnets. The magnet unit has a plurality of segments each having at least one magnet, and the magnetization directions of segments adjoining one another are angled at least approximately by 90°, preferably by exactly 90°, relative to one another.

15 Claims, 9 Drawing Sheets

INSPECTION DEVICE FOR THE INSPECTION OF TWO-DIMENSIONALLY EXTENDING METAL OBJECTS

CROSS REFERENCE

This application claims priority to PCT Application No. PCT/EP2021/057997, filed Mar. 26, 2021, which itself claims priority to German Patent Application No. 10 2020 108 963.5, filed Mar. 31, 2020, the entireties of both of which are hereby incorporated by reference.

FIELD OF THE INVENTION

The present invention relates to an inspection device for inspecting metallic objects extending in planar fashion, in particular sheets or walls, the inspection device being embodied as pipeline-impassable in particular by virtue of dispensing with at least one propulsion element that at least substantially fills an inner pipeline cross section, comprising at least one functional unit for recording object information and also comprising at least one magnet unit provided for magnetizing the object and having a plurality of magnets.

Such an inspection device for nondestructive testing is embodied for example as a handheld inspection apparatus having at least one handle or as an apparatus to be installed in a stationary manner and having a frame to be arranged in a stationary manner. The inspection device may alternatively or supplementarily be one which is to be guided along the exterior of a pipeline, a metal wall or a metal sheet by means of a handle or some other guide or drive device or which actively moves along the exterior of said pipeline/metal wall/metal sheet independently by means of at least one drive element. For the purposes of the present application, "pipeline-impassable" means that the inspection device does not form a pig that is moved passively or actively through a pipeline. A passive movement of a pig through a pipeline is produced in particular by means of a propulsion element which at least substantially fills an inner, free pipeline cross section and against which a fluid moving in the pipeline can press.

BACKGROUND OF THE INVENTION

Inspection devices of this type generally have a magnet unit in order to magnetize the metallic object to be tested by means of the magnet unit. On account of the magnetic field generated in the object, signals that can be recorded or processed by the functional unit arise depending on the type of nondestructive testing. The magnetic fields required for the magnetization of the object can be generated by electromagnets and/or permanent magnets. What is disadvantageous is that with high field strengths these magnets require a comparatively large amount of energy or have a large structural size and are correspondingly heavy.

BRIEF SUMMARY OF THE INVENTION

The problem addressed by the present invention is that of providing an inspection device which does not have the disadvantages mentioned.

The problem is solved by means of an inspection device wherein the magnet unit has a plurality of segments each having at least one magnet and the magnetization directions of segments adjoining one another are angled or tilted at least approximately by 90°, preferably by exactly 90°, relative to one another. The embodiment of such a magnet unit enables the magnetic flux densities to be increased and gives rise to a number of possible arrangements in which the flux densities in the object are increased. The magnetic field which acts on the object and is generated therein is stronger than in the case of magnets that are usually used, with the result that the construction of the entire magnet unit can be made shorter and smaller and the construction of the inspection device can thus be made lighter.

The magnet unit can also be part of the functional unit, or one or more parts of the functional unit can be arranged in the magnet unit or can be part thereof. Furthermore, depending on the technology used, the functional unit has in particular one or more units necessary for the generation of excitation signals and/or for the recording of object information in the form of measurement signals, e.g. one or more sensors (e.g. transmitting and/or receiving transducers), control and/or evaluation electronics, energy stores, transfer and/or interface means, etc.

Preferably, a segment of the magnet unit comprises a single magnet, although it can also have a plurality of magnets directed in particular identically with regard to their magnetization direction.

Magnets adjoining one another are magnets that bear against one another in a manner separated by a magnet mount or in a manner directly touching one another.

Preferably, the magnets of the segments or of the magnet unit are permanent magnets, in particular neodymium magnets. In particular, the poles directed toward one another of two segments separated by a further segment have an identical polarity, i.e. hey both form either north or south poles directed towards one another, a magnet of a further segment being arranged between the magnets or segments. In particular, this segment arranged therebetween has its own north pole or south pole side likewise pointing in a direction of the surface of the object during the operation. As a result, during operation, a first focusing of the magnetic field lines toward the surface is already effected, while an attenuation of the magnetic field lines is present on the side of the magnet unit facing away from the surface. Such magnet units constructed in the manner of Halbach arrays already result in higher flux densities and higher magnetic field strengths in the object, as a result of which the construction of the magnet units and thus of corresponding pig segments can be made shorter.

The segments whose magnets are provided with a magnetization direction (direction north-south) substantially perpendicular to the surface of the object to be inspected (during operation) are also referred to hereinafter as vertical segments. The magnetization direction, which is identified by an imaginary line from the north pole to the south pole, is in an angle range of ±15° around a perpendicular to the surface of the object. Accordingly, the magnetization direction is inclined by 75° to 105°, preferably by 90°, with respect to the surface of the object to be considered if inspection device and object move relative to one another during operation. The magnetization direction of a segment corresponds to the magnetization direction of the magnet(s) forming the segment.

The vertical segment results in the introduction of magnetic field lines directed approximately or directly perpendicularly in the direction of the surface of the object during operation, which is advantageous for an EMAT wall thickness measurement, for example. In this case, as also above, approximately perpendicularly means in a range of ±15° around a perpendicular.

An inspection device according to the invention is furthermore improved if, in accordance with a further embodiment according to the invention, the vertical segment is bounded by a focusing element toward the surface of the object to be inspected (during operation). Such a focusing element, formed in particular at least substantially from steel, serves for further concentration and amplification of the magnetic field lines. The focusing element is magnetizable, in particular.

It has surprisingly been found that, better than in the case of magnet arrangements in the manner of a Halbach array without focusing element(s), in which the maximum introduction of the magnetic field is limited by the saturation flux density, very high flux densities can be realized through the additional use of the focusing element. The efficiency, i.e. the magnetic field strength measurable in the object during operation, increases by up to a factor of 3. Conversely, units to be used for attaining previous flux densities in the material of the object can thus be constructed with a significantly smaller size than previously, which in turn improves in particular the portability and/or the design of the inspection device.

Accordingly, in the case of an embodiment of an inspection device according to the invention in which the focusing element is bounded by a magnet on at least three sides, the poles of the magnets that are situated on these sides having an identical polarity, but in particular belonging simultaneously to different segments, a drastic increase in the magnetic field strengths and flux densities in the object to be inspected arises during operation. Such a device according to the invention is constructed in a manner significantly shorter than devices from the prior art that generate identical forces.

The flux densities present in the focusing element, constructed in particular at least substantially from steel comprising cobalt and iron, are in particular up to 2.5 T, but at least up to 2.3 T. By way of example, in the case of a magnet unit which is provided with nine magnets lying one behind another and in which magnets succeeding one another have magnetization directions tilted with respect to one another and are arranged to form a type of Halbach array, an attractive force with respect to the object of up to 45 kN arises. A magnet unit which is additionally provided with focusing elements as described above, but is otherwise constructed with the same sequence and magnetization direction of the magnets having the same strength, results in attractive forces of 180 kN.

Inspection devices provided with corresponding magnet units can thus be constructed in a significantly shorter fashion in conjunction with the same forces and are lighter and thus exhibit better portability, for example.

For the purpose of further focusing of the magnetic field lines in the direction toward or in the direction of the surface of the object to be inspected, in accordance with a further exemplary embodiment according to the invention, the magnet units, in a longitudinal direction parallel to the surface of the object to be inspected, can have a surround which is at least concomitantly formed from a magnetizable material and which bounds the magnets of the magnet unit. In a view in a transverse direction with respect to the longitudinal direction, corresponding surrounds are present in the magnet unit at the front and back in the direction of movement, for example.

Alternatively or supplementarily, a magnet unit—preferably embodied in an elongate fashion—of an inspection device according to the invention can also be aligned transversely with respect to the longitudinal direction, its outer side then being adapted for example to a curvature of an outer surface to be considered of a pipeline wall. Magnet units embodied with their longitudinal extent parallel to the longitudinal direction can also be provided with an outer side whose curvature is adapted with respect to the curvature of an outer surface of a pipeline wall or of a sheet produced in a curved fashion.

The surround as well as the focusing element are formed in particular from cobalt-iron steel, but at least an in particular from magnetizable steel.

In accordance with one development according to the invention, the magnet unit is provided with a sensor for recording object information, i.e. sensor data or inspection data. The sensor of the functional unit is thus likewise assigned to the magnet unit. Said sensor is in particular arranged in the focusing element, in a recess thereof and/or on the focusing element and thus arranged centrally in or on the magnet unit. According to the above, it is evident that the magnetization directions of the segments that are not embodied as vertical segments preferably run parallel or approximately parallel to the longitudinal direction, corresponding to the preferred movement direction during operation. Such an embodiment can be present for example in the case of a design of the functional unit for an EMAT test and/or wall thickness sensor.

The magnet unit, in the longitudinal direction thereof, preferably has at least three magnets arranged one behind another, in which case, in accordance with a further exemplary embodiment, in particular seven magnets are arranged one behind another, such that there are preferably two focusing elements bounded by north poles of permanent magnets and one focusing element bounded by south poles. Furthermore, it is possible, in particular, to allow respective focusing elements to be laterally bounded not only by three but in particular also by five magnets.

While magnet units for inspection purposes are typically embodied in parallelepipedal block-checked and/or elongate fashion, in accordance with a further exemplary embodiment according to the invention it can be advantageous to form ring-shaped magnet units in order to generate corresponding magnetic fields in a targeted manner in the surface of the object.

In order to avoid adhesion effects at the considered surface of the object, a pig according to the invention in accordance with a further exemplary embodiment has at least one spacer which is preferably embodied so as to be adjustable with regard to a distance between the magnets and the wall or surface and which allows the magnet unit to be positionable at a distance from the surface of the object to be inspected. In order to cover a curved contour of the object, e.g. an outer surface of a pipeline, the inspection device can have a plurality of magnet units next to one another as viewed once again in the movement direction that occurs during operation.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE INVENTION

Figure 1:
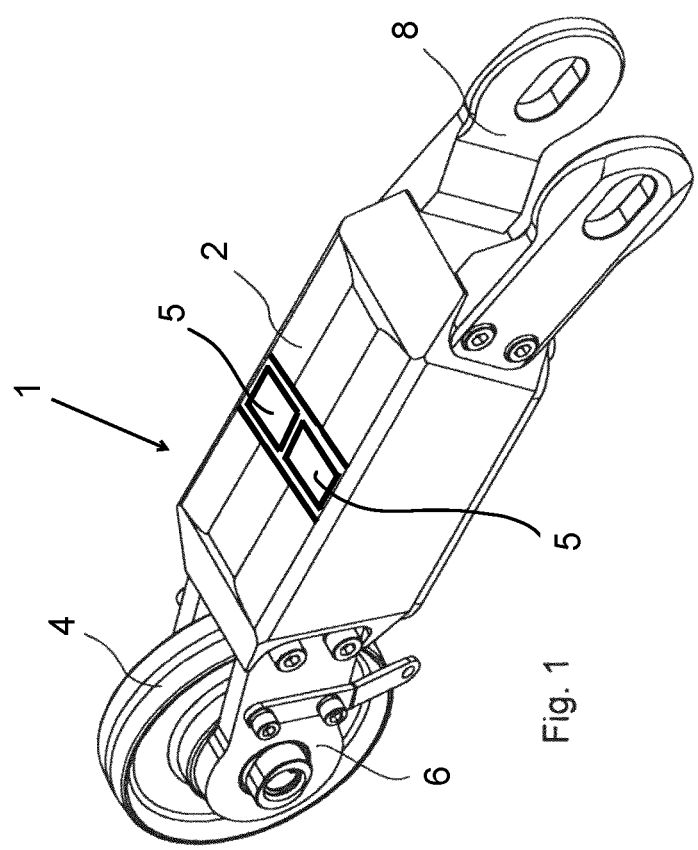
FIG. 1 shows a spacer with a magnet unit of a device according to the invention in a perspective illustration.

Individual technical features of the exemplary embodiments described below can also be combined in combination with exemplary embodiments described above and also the features of the independent claim and any further claims to form subjects according to the invention. In so far as is expedient, elements having an identical functional effect are provided with identical reference numerals.

FIG. 1 shows a perspective illustration of a part of a spacer 1 of an inspection device according to the invention, said spacer having a magnet unit 3. The spacer 1 comprises a housing 2, in which the magnet unit 3 is housed, said magnet unit being discernible in FIG. 3. The housing 2 is depicted such that its side directed toward the surface of the object to be inspected is illustrated facing upward in FIG. 1. A distance with respect to the object is adjusted by way of a wheel 4 mounted rotatably in a fork 6. Two sensors respectively embodied as transmitting and receiving transducers serve for generating and recording measurement signals. Illustrated at the opposite end of the spacer 1 is a further fork 8, which can be mounted on a supporting frame of an inspection device according to the invention and/or can optionally be provided with a further wheel.

Figure 2:
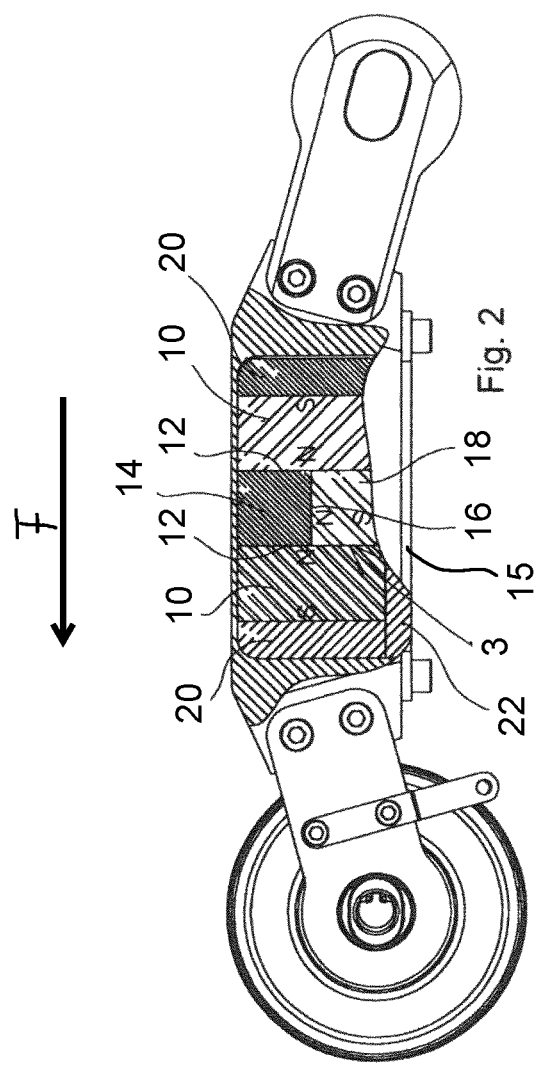
FIG. 2 shows the device according to FIG. 1 in a partly cut-away view.

The magnet unit 3 has two magnets 10, whose magnetization directions (direction north-south) run parallel or at least approximately parallel to the longitudinal direction F, corresponding to the main movement direction of the inspection device during operation, and whose north pole sides 12 face toward one another (FIG. 2). Relative to the magnet unit 3, in FIG. 2 the direction arrow is situated on the side of the surface to be inspected during operation.

At the same time, both north pole sides 12 bear against a focusing element 14. On its side situated toward the direction arrow F, a further magnet 18 goes against said focusing element with its north pole side 16 (cf. FIG. 3). This magnet has a magnetization direction which is tilted or angled by 90° with respect to the magnetization direction of the magnets 10.

In the longitudinal direction of the magnet unit running parallel to the arrow F, the magnet unit has surrounds 20 constructed from a magnetizable material, preferably a steel comprising cobalt and iron, the surrounds 20 bounding the magnets of the magnet unit 3 in such a way that they adjoin the latter at the front and back in the longitudinal direction.

The focusing element 14 is also composed of a steel comprising cobalt and iron. By virtue of the arrangement outward away from an underside 15 and in the direction toward the surface of the object to be inspected, the focusing element 14 attains flux densities of preferably 2 to 3 teslas. The magnetic flux is compressed by the magnet 18 by means of the focusing element 14 embodied as a steel element in such a way as to result in focusing of the magnetic field lines toward the object. While standard Halbach arrays are limited in terms of their maximum introduction of the magnetic field by the saturation flux density, the embodiment of the inspection device according to the invention increases the attractive force by up to a factor of at least 3 as described above. Therefore, weight and costs can be kept correspondingly low. In the exemplary embodiments in the figures, the segments of the magnet units are each formed by a magnet, which then also predefines the magnetization direction of the respective segment.

On one side of the magnet unit 3 there is an inner surround 22, which additionally shields the magnetic field of the magnet unit 3, said magnetic field already being virtually negligible anyway, in this direction.

Figure 3:
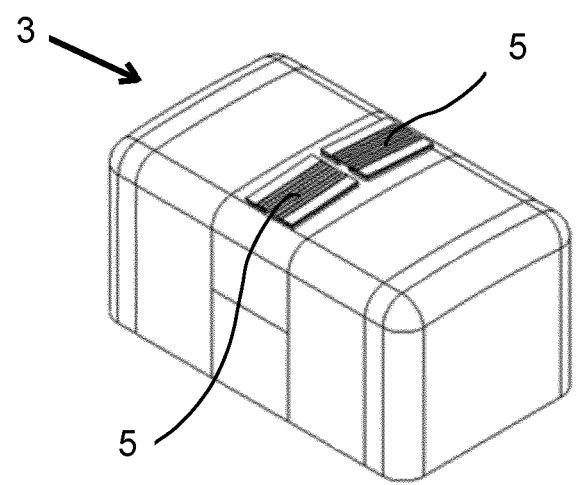
FIG. 3 shows a perspective illustration of a further magnet unit with sensors.

The magnet unit according to FIG. 1 is supplementarily illustrated in FIG. 3. Such a magnet unit together with the sensors 5 forms a part of a functional unit for recording object information in the form of sensor data.

Figure 4:
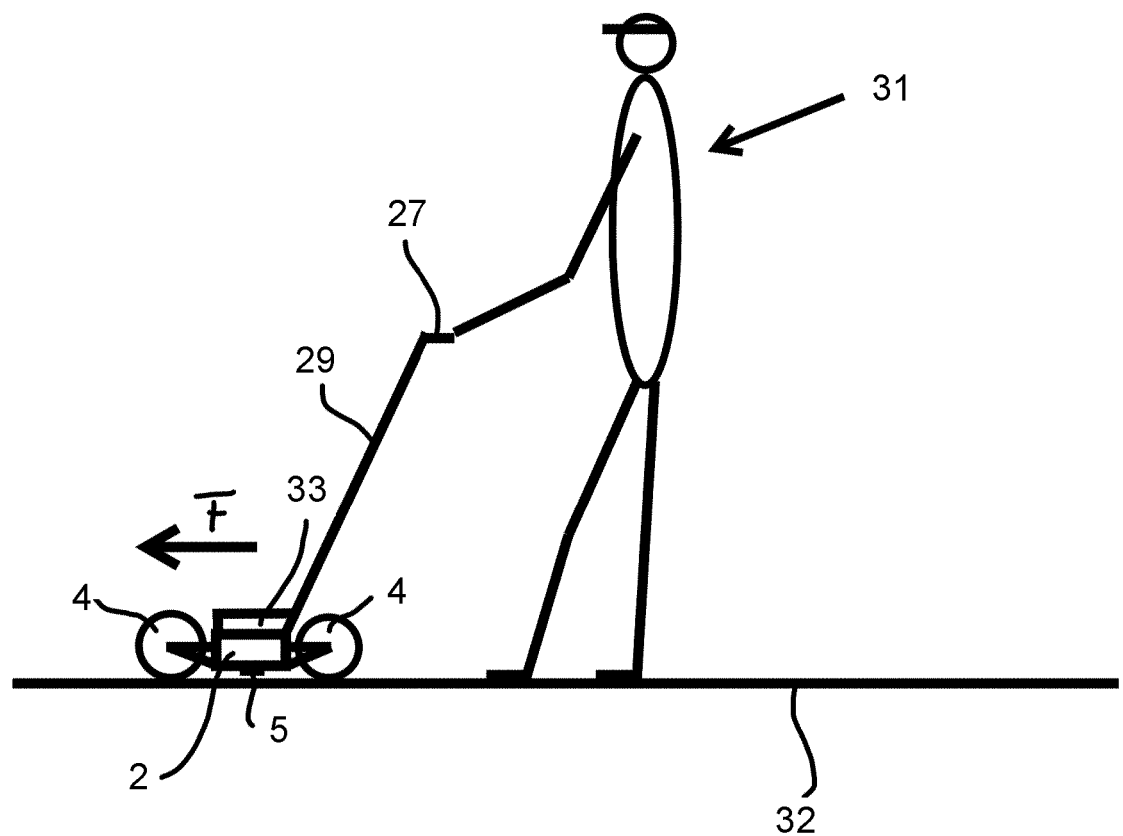
FIG. 4 shows a basic illustration of the use of an inspection device according to the invention.

An inspection device according to the invention in accordance with FIG. 4 is provided with a handle 27, which constitutes the upper end of a guide device having a guide rod 29, by means of which guide device the inspection device can be moved by an operator 31 in the direction F along a surface of an object 32 to be inspected in the form of a metal sheet. This involves for example a lower boundary or wall of an oil store.

The functional unit of the inspection device furthermore comprises the sensors 5 and, in the further housing 33, means for signal generation and evaluation. The sensors 5 are in particular EMAT-WT sensors, i.e. sensors for the electromagnetic-acoustic measurement of the wall thicknesses of the object 32.

Figure 5:
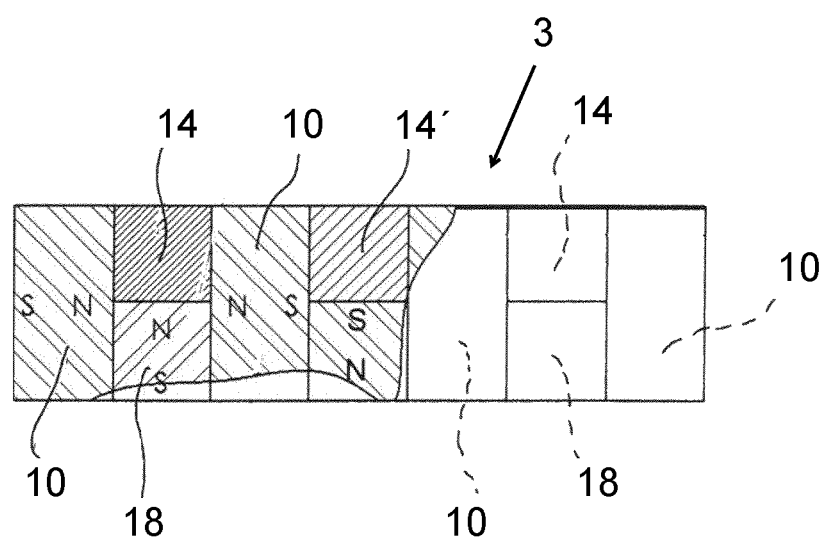
FIG. 5 shows a simplified view of a magnet unit of a further device according to the invention in a partly sectional illustration.
Figure 6:
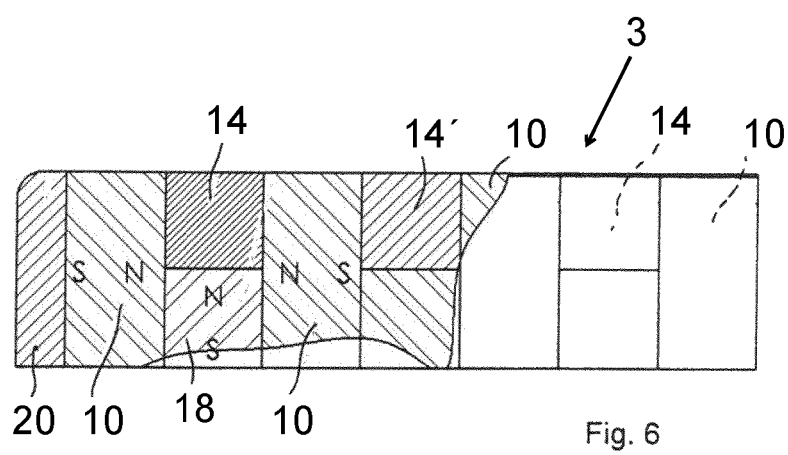
FIG. 6 shows a magnet unit of a further inspection device according to the invention.

A magnet unit 3 of a further inspection device according to the invention having a greater number than three magnets is illustrated in FIG. 5. In the present case, focusing elements 14 are each arranged on the north pole sides of the adjacent magnets 10 and 18, respectively. A further focusing element 14' is correspondingly bounded by south pole sides of the adjacent magnets. In addition to this, a magnet unit can have the surround 20 illustrated in FIG. 6, as already described.

Figure 7:
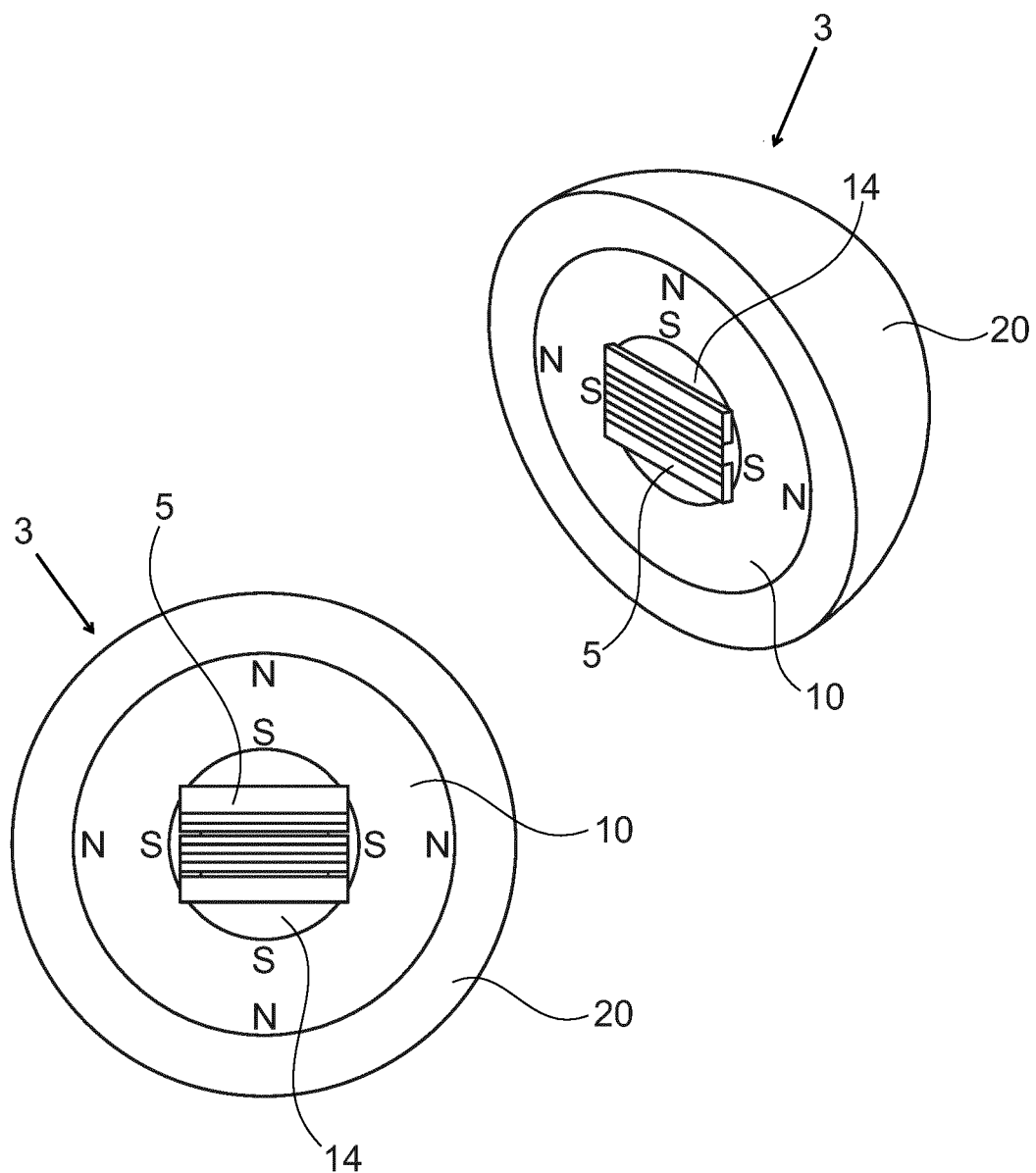
FIG. 7 shows a view of a magnet unit of a further object according to the invention in a sectional illustration and a perspective illustration.

FIG. 7 discloses, in the two depictions there, an alternative embodiment of a magnet unit 3. The depiction at the top right in FIG. 7 shows a perspective illustration, while a matching cross section is illustrated at the bottom left in FIG. 7. A hemispherical focusing element 14 is bounded by an integral or multipartite magnet 10, which is annular in cross section and which is in turn arranged within a surround 20. The surround 20 composed of steel in the form of a hemispherical shell serves as a magnetic return path.

Figure 8:
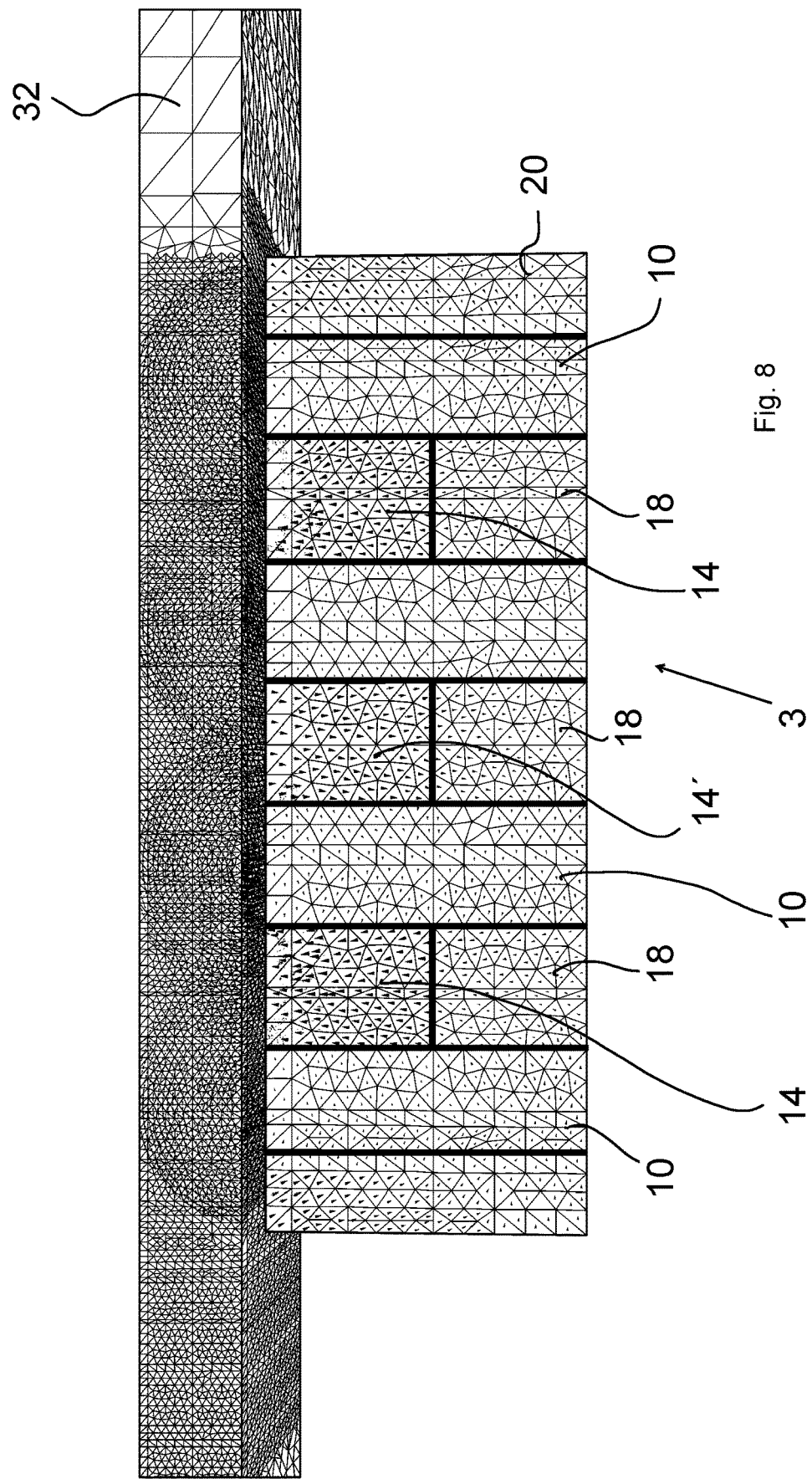
FIG. 8 shows magnetic field lines in a magnet unit of an inspection device according to the invention and also an object to be inspected.
Figure 9:
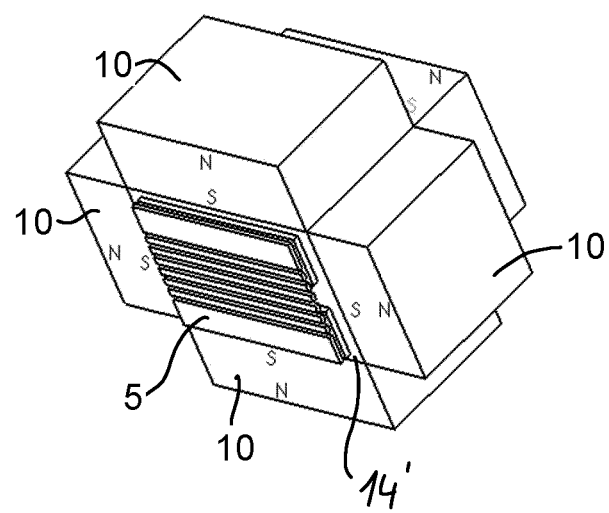
FIG. 9 shows a magnet unit of a further object according to the invention.

The magnetic field lines that arise in a magnet unit 3 and the object 32 arranged closely beside the latter during operation are symbolized by black acute triangles in FIG. 8. A sensor 5 is present in this case, but not illustrated. In FIG. 8, the triangles are situated in the cells of a triangular grid—produced on the basis of the computational simulation of the magnetic field lines—both of the magnet unit 3 and of the wall of the object 32. The greater the gradients of the magnetic field lines in relation to direction and/or amplitude, the finer the resolution and the smaller the cells of the grid. The magnetic flux densities present in the focusing elements 14, 14' are particularly high, symbolized by correspondingly large triangles.

A magnet unit which is particularly well suited to the use of an inspection device embodied as an autonomous handheld inspection apparatus additionally has magnets on the sides which furthermore focus the magnetic field on the focusing element 14 and intensify it in the manner described above.

The invention claimed is:

1. An inspection device for inspecting metallic objects extending in planar fashion, the inspection device being embodied as pipeline-impassable, the inspection device comprising:
at least one functional unit for recording object information;
at least one magnet unit provided for magnetizing the object and having a plurality of segments, wherein
each segment has a magnet,
the plurality of segments includes a first segment, a second segment, and a third segment,
the first segment has a first magnetization direction,
the second segment has a second magnetization direction,
the third segment has a third magnetization direction,
the third segment is between the first segment and the second segment,
the first magnetization direction and the second magnetization direction are substantially parallel and opposite, and
the third magnetization direction is substantially orthogonal relative to the first magnetization direction and the second magnetization direction,
the magnet of each segment is a permanent magnet,
the first segment has a first side,
the second segment has a second side, and
the first side and the second side face one another and have an identical polarity.

2. The inspection device of claim 1, wherein the third segment is vertical, and the third magnetization direction is directed toward a surface of an object to be inspected.

3. The inspection device of claim 2, wherein a focusing element focuses a magnetic field of the third segment toward the surface of the object to be inspected.

4. The inspection device as claimed in claim 3, wherein the focusing element is between the first side and the second side,
the third segment has a third side facing the focusing element,
the third side has a third pole, and
the first side, the second, and the third have the identical polarity.

5. The inspection device as claimed in claim 3, wherein the magnet unit has a sensor for recording inspection data.

6. The inspection device as claimed in claim 5, wherein the sensor is connected to the focusing element.

7. The inspection device as claimed in claim 1, wherein the magnet unit is positioned in a longitudinal direction parallel to the surface of the object to be inspected, and has at least one surround which is at least concomitantly formed from a magnetizable material and which bounds the magnets of the magnet unit.

8. The inspection device as claimed in claim 1, wherein first segment, the second segment, and the third segment are arranged in a longitudinal direction of the magnet unit.

9. The inspection device as claimed in claim 1, wherein a plurality of magnet units are arranged next to one another.

10. The inspection device as claimed in claim 1, further comprising an adjustable spacer, wherein the magnet unit is adjustably positionable relative to the surface of the object via the adjustable spacer.

11. The inspection device of claim 1, wherein the inspection device is configured to be moved by an operator.

12. An inspection device for inspecting metallic objects extending in planar fashion, the inspection device being embodied as pipeline-impassable, the inspection device comprising:
at least one functional unit for recording object information;
at least one magnet unit provided for magnetizing the object and having a plurality of segments, wherein
each segment has a magnet,
the plurality of segments includes a first segment, a second segment, and a third segment,
the first segment has a first magnetization direction,
the second segment has a second magnetization direction,
the third segment has a third magnetization direction,
the third segment is between the first segment and the second segment,
the first magnetization direction and the second magnetization direction are substantially parallel and opposite, and
the third magnetization direction is substantially orthogonal relative to the first magnetization direction and the second magnetization direction,
the magnet of each segment is a permanent magnet,
the first segment has a first side,
the second segment has a second side, and
the first side and the second side face one another and have an identical polarity,
the third segment is vertical, and
the third magnetization direction is directed toward a surface of an object to be inspected.

13. An inspection device for inspecting metallic objects extending in planar fashion, the inspection device being embodied as pipeline-impassable, the inspection device comprising:
at least one functional unit for recording object information;
at least one magnet unit provided for magnetizing the object and having a plurality of segments, wherein
each segment has a magnet,
the plurality of segments includes a first segment, a second segment, and a third segment,
the first segment has a first magnetization direction,
the second segment has a second magnetization direction,
the third segment has a third magnetization direction,
the third segment is between the first segment and the second segment,
the first magnetization direction and the second magnetization direction are substantially parallel and opposite, and
the third magnetization direction is substantially orthogonal relative to the first magnetization direction and the second magnetization direction,
the magnet of each segment is a permanent magnet,
the first segment has a first side,
the second segment has a second side, and
the first side and the second side face one another and have an identical polarity the third segment is vertical,
the third magnetization direction is directed toward a surface of an object to be inspected, and
a focusing element focuses a magnetic field of the third segment toward the surface of the object to be inspected.

14. The inspection device of claim 13, wherein
the magnet unit is positioned in a longitudinal direction parallel to the surface of the object to be inspected,
a first surround formed of a magnetizable material adjoins a front end of the plurality of segments, and
a second surround formed of the magnetizable material adjoins a rear end of the plurality of segments.

15. The inspection device of claim 13, wherein the first, second, and third segments are arranged longitudinally relative to one another.

\* \* \* \* \*